United States Patent
Mizuno et al.

(10) Patent No.: US 7,103,253 B2
(45) Date of Patent: Sep. 5, 2006

(54) OPTICAL FIBER COATING REMOVING DEVICE

(75) Inventors: Shunichi Mizuno, Kanagawa (JP); Kazunari Hattori, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/480,469

(22) PCT Filed: Jun. 10, 2002

(86) PCT No.: PCT/JP02/05733

§ 371 (c)(1),
(2), (4) Date: Jul. 15, 2004

(87) PCT Pub. No.: WO02/101433

PCT Pub. Date: Dec. 19, 2002

(65) Prior Publication Data

US 2005/0002632 A1    Jan. 6, 2005

(30) Foreign Application Priority Data

Jun. 12, 2001   (JP) ............................. 2001-177042

(51) Int. Cl.
*G02B 6/00*   (2006.01)
*H02G 1/12*   (2006.01)
*B26D 1/00*   (2006.01)

(52) U.S. Cl. ................ 385/134; 385/137; 81/9.51; 83/679

(58) Field of Classification Search ............. 385/123, 385/134, 137, 124; 30/90.1–91.2
See application file for complete search history.

(56) References Cited

U.S. PATENT DOCUMENTS

| | | | |
|---|---|---|---|
| 4,509,257 A | | 4/1985 | Moriyama |
| 5,727,914 A | * | 3/1998 | Zivi et al. ................ 409/298 |
| 6,052,880 A | | 4/2000 | Basavanhally |
| 6,196,087 B1 | * | 3/2001 | Furuya ..................... 81/9.51 |
| 6,549,712 B1 | * | 4/2003 | Abe et al. .................. 385/123 |
| 6,668,128 B1 | * | 12/2003 | Hattori et al. ............. 385/136 |
| 6,688,207 B1 | * | 2/2004 | Tabeling .................... 83/679 |
| 6,708,749 B1 | * | 3/2004 | McLeod .................... 156/584 |
| 6,754,960 B1 | * | 6/2004 | Shiraishi et al. ............ 30/90.6 |

FOREIGN PATENT DOCUMENTS

| | | |
|---|---|---|
| JP | 1-147503 A | 6/1989 |
| JP | 10-48432 A | 2/1998 |
| JP | 11-119032 A | 4/1999 |
| WO | WO 98/33082 | 7/1998 |

* cited by examiner

*Primary Examiner*—Sung Pak
*Assistant Examiner*—Tina M Wong
(74) *Attorney, Agent, or Firm*—McDermott Will & Emery LLP (57) ABSTRACT

An object of the invention is to provide an optical fiber coating removing apparatus which can remove coating from an optical fiber preform without damaging the optical fiber surface. The apparatus is excellent in workability because positioning or the like for coating removal easily. The invention provides an optical fiber coating removing apparatus for holding coating 1b of an end portion of an optical fiber 1 between a pair of coating removing blades and removing the coating 1b from the optical fiber 1 with the pair of the blades. In each blade 11, 11', a blade pressing plate 12, 12', a semicircular blade 13, 13' having a semicircular eating blade portion 13a, and a flat blade 14, 14' having a straight-line eating blade portion 14a having a triangular section are integrally laminated onto a blade bearing plate 15, 15' in that order. The coating 1b is removed without damaging the surface of the optical fiber.

10 Claims, 8 Drawing Sheets

OPTICAL FIBER COATING REMOVING DEVICE

TECHNICAL FIELD

The present invention relates to a coating removing apparatus which can remove coating from an end portion of an optical fiber when the optical fiber having coating removed therefrom is connected with another optical fiber by fusion splicing.

BACKGROUND ART

When optical fibers are connected to each other, or when an optical fiber is connected to an optical component, first the coating in an end portion of each optical fiber is removed to expose the glass portion thereof. After that, the surface of the glass portion of the optical fiber exposed after the coating removal is cleaned by wiping off residual parts of the coating or the like with apiece of gauze or the like impregnated with a solvent. After that, a part of this glass portion is cut off with a fiber cutter (creeper) so that the glass portion has a predetermined exposed length. Thus, a mirror-finished cut surface is obtained. Such a series of steps for terminal working in the end portion of the optical fiber are carried out individually with tools special to those steps respectively, or carried out with an automated apparatus.

Figure 8:
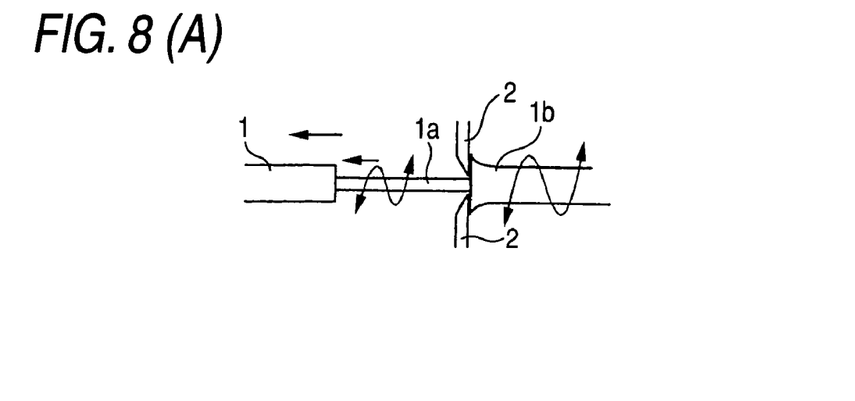
FIG. 8 is a view for explaining conventional examples of coating removal.

Removal of coating from an optical fiber is carried out, for example, by nipping the coating of a single-core optical fiber with a pair of coating removing blades, making the blades eat into the coating, and pulling the coating from the optical fiber with the coating removing blades. FIG. 8 is a view showing examples of removal of coating from a conventional optical fiber. FIG. 8(A) shows an example of removal of coating with flat blades, and FIG. 8(D) shows an example of removal of coating with semicircular blades.

As shown in FIG. 8(A), when coating 1b of an optical fiber 1 is removed with a pair of flat blades 2, the upper and lower flat blades 2 and 2 are made to eat into the coating 1b shallowly enough not to come into direct contact with the surface of a glass portion 1a of the optical fiber 1. In this state, when the optical fiber 1 is pulled in the left direction shown by the arrow in the drawing, the coating 1b is ripped down at the place where the blades eat. Then, the coating 1b is removed while forming a swelling on the right of the blades.

When the outer diameter of the glass portion 1a is 0.125 mm and the outer diameter of the coating 1b is not larger than 0.3 mm, the distance between the pair of flat blades 2 will be about 0.2 mm, and the distance between the glass portion 1a and each flat blade 2 will be about 0.04 mm.

When the thickness of the coating 1b of the optical fiber 1 is small, pulling out the coating 1b may make the optical fiber 1 shake up and down. When the coating 1b is pulled out in the state where the optical fiber 1 shakes up and down, the pair of flat blades 2 and 2 further eat into the coating 1b so that the surface of the glass portion 1a of the optical fiber 1 is brought into contact with the blades. Thus, the surface of the glass portion 1a is apt to be damaged. When the surface of the glass portion 1a is damaged, the strength in connecting optical fibers to each other by fusion splicing is lowered so that the connection may be broken easily.

It is therefore known that a resin layer is added to a coating portion to be removed so that the thickness of the coating is increased, and the coating 1b is removed together with the added resin layer (see Japanese Patent Laid-Open No. 94925/1994). However, it requires extra labor to form the coating resin layer additionally for coating removal. In addition, when the upper and lower flat blades 2 and 2 are made to eat into the coating 1b, the sectional shape of the coating 1b becomes an elliptic shape as shown in FIG. 8(B). When the coating 1b is pulled out in this state, the end portion from which the coating 1b has been removed is expanded like an elliptic trumpet as shown in FIG. 8(C). Thus, there is also a problem that failure in shape is apt to occur in a molding step in which glass portions 1b are connected to each other by fusion splicing and the fusion splicing portion thereof is covered with resin or the like.

As shown in FIG. 8(D), when coating is removed with a pair of semicircular blades 3 and 3, first, the semicircular blade portions are made to eat into the coating 1b shallowly enough not to come into direct contact with the glass portion 1a. The semicircular blades 3 are steadier than the flat blades 2 when the optical fiber is pulled out. Thus, it is difficult for the optical fiber surface to abut against the blades.

However, when the optical fiber 1 is pulled out in the left direction shown by the arrow in the drawing, the coating 1b is ripped down at the place where the blades eat into the coating 1b, coating dust 1c is collectively concentrated on the right side of the blades. When the coating dust is concentrated, the pulling resistance increases so that it becomes difficult to pull out the optical fiber 1. When the optical fiber 1 is pulled forcedly, the optical fiber 1 will be broken. In addition, when the adhesive force between the coating 1b and the glass portion 1a is great, the coating dust is crushed to powder to increase the residual part of the coating 1b adhering to the glass portion 1b. Thus, the workability to remove the coating dust (residual part) deteriorates.

In order to facilitate the removal of coating from an optical fiber, there is also known a technique in which a heater is disposed in a coating removing apparatus and heating by the heater is used to weaken the adhesive force between the optical fiber and the coating. However, the aforementioned problem in coating removing blades themselves has not been solved.

It is an object of the present invention to provide an optical fiber coating removing apparatus which can carry out coating removal easily without damaging the surface of a glass portion of an optical fiber when the coating of the optical fiber is removed therefrom.

Further, it is another object of the present invention to provide an optical fiber coating removing apparatus which is excellent in workability because it can carry out positioning or the like for removing the coating of the optical fiber easily.

DISCLOSURE OF THE INVENTION

An optical fiber coating removing apparatus according to the present invention is an optical fiber coating removing apparatus for nipping coating of an end portion of an optical fiber with a pair of coating removing blades and removing the coating with the pair of coating removing blades, wherein each of the aforementioned coating removing blades is constituted by a semicircular blade having a semicircular eating blade portion and a flat blade having a straight-line eating blade portion having a triangular shape in section.

Further, in the optical fiber coating removing apparatus according to the present invention, it is desired that a blade pressing plate and a blade bearing plate are provided in each of the aforementioned coating removing blades, and the aforementioned blade pressing plate, the aforementioned semicircular blade and the aforementioned flat blade are fixedly laminated onto the aforementioned blade bearing plate in that order.

Further, in the optical fiber coating removing apparatus according to the present invention, it is desired that a V-shaped notch for positioning the aforementioned optical fiber is formed in the aforementioned blade bearing plate.

Further, in the optical fiber coating removing apparatus according to the present invention, it is desired that heating means for heating the end portion of the aforementioned optical fiber is provided in a body portion having the aforementioned coating removing blades attached thereto.

Further, in the optical fiber coating removing apparatus according to the present invention, it is desired that an optical fiber holder capable of holding the aforementioned optical fiber and a holder support table for supporting the aforementioned optical fiber holder are provided.

Further, in the optical fiber coating removing apparatus according to the present invention, it is desired that a lifting member is provided for lifting up a front end portion of the aforementioned optical fiber protruding from the aforementioned optical fiber holder so as to prevent the front end portion of the aforementioned optical fiber from colliding with the aforementioned coating removing blades when the aforementioned optical fiber holder is moved to a predetermined position, and for releasing the front end portion of the aforementioned optical fiber from lifting up when the aforementioned optical fiber holder has been moved to the predetermined position.

Incidentally, as for the reference numerals in the drawings, 1 designates an optical fiber; 1*a*, a glass portion; 1*b*, coating; 11 and 11', coating removing blades; 12 and 12', blade pressing plates; 13 and 13', semicircular blades; 14 and 14', flat blades; 15, 15', blade bearing plates; 16, a screw; 17, a body portion; 18, a pressing portion; 19, a mounting screw; 20, an optical fiber holder; 21, a holder base; 22, a clamp member; 23, a hinge shaft; 24, an extension portion; 25, a V-groove; 26, an elastic member; 27 and 28, magnets; 30, a base table; 31, a holder support table; 32, a holder clamp; 33, a rail; 34, a rear portion stopper; 35, a lifting member mounting table; 36, a lifting member; 37, a heater (heating means); and 38, a protrusion.

BEST MODE FOR CARRYING OUT THE INVENTION

An embodiment of the present invention will be described with reference to the drawings.

Figure 1:
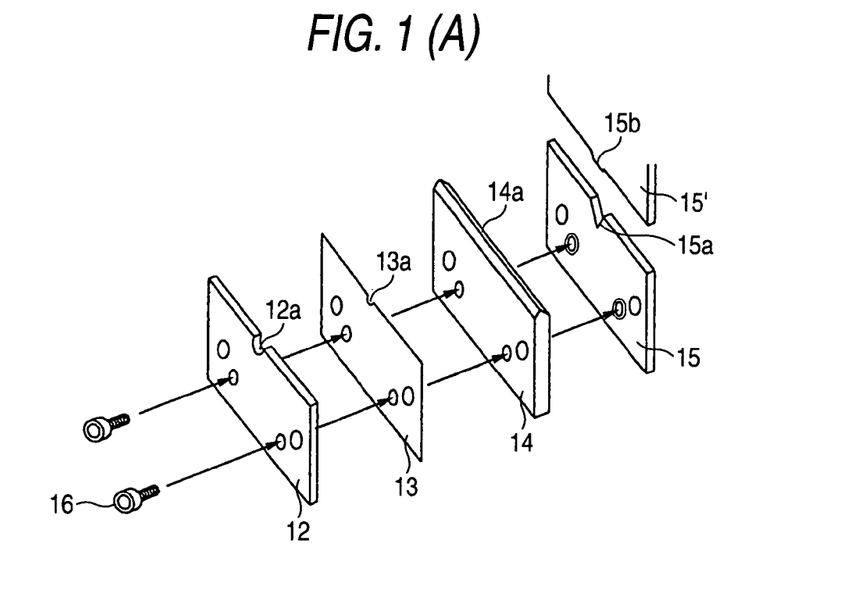
FIG. 1 shows an example of coating removing blades for use in an optical fiber coating removing apparatus according to the present invention, FIG. 1(A) being an exploded perspective view, FIG. 1(B) being a sectional view, FIG. 1(C) being a sectional view taken on line a—a in FIG. 1(B)

FIG. 1 shows an example of coating removing blades for use in an optical fiber coating removing apparatus according to the present invention, FIG. 1(A) being an exploded perspective view, FIG. 1(B) being a sectional view, FIG. 1(C) being a sectional view taken on line a—a in FIG. 1(B).

In this embodiment, optical fiber preform having one or more layers of coating applied to a glass portion such as a core, a clad or the like, optical fiber ribbon having one or more layers of coating further applied onto the optical fiber preform, and so on, will be referred to as "optical fibers" collectively.

A lower coating removing blade 11 has a blade pressing plate 12, a semicircular blade 13, a flat blade 14 and a blade bearing plate 15 laminated in that order. This coating removing blade 11 is fixed integrally by use of fixing means such as a screw 16 or the like. Further, the coating removing blade 11 is attached to a body portion 17 of the coating removing apparatus by a mounting screw 19. An upper coating removing blade 11' opposed to this lower coating removing blade 11 has a substantially similar configuration to that of the lower coating removing blade 11. The upper coating removing blade 11' and its constituent members are appended with the sign "'". That is, the upper coating removing blade 11' has a blade pressing plate 12', a semicircular blade 13', a flat blade 14' and a blade bearing plate 15' laminated in that order and fixed integrally by use of a screw or the like. In addition, although the upper edge of the lower coating removing blade 11 corresponds to the lower edge of the upper coating removing blade 11', the following description will be made with the lower edge of the upper coating removing blade 11' referred to as "upper edge" because it designates the same constituent part as the upper edge of the lower coating removing blade 11.

The blade pressing plate 12, 12' is formed out of a metal plate of aluminum, stainless steel or the like. A semicircular notch 12*a* for allowing an optical fiber 1 to pass therethrough is formed at the center of the upper edge of the blade pressing plate 12, 12'. The semicircular blade 13, 13' is formed out of a thin metal plate of stainless steel or the like. A blade portion 13*a* made of a semicircular notch having a diameter smaller than the outer diameter of coating 1*b* of the optical fiber 1 and larger than the outer diameter of a glass portion 1*a* of the optical fiber 1 is formed at the center of the upper edge of the semicircular blade 13, 13'.

The flat blade 14, 14' is formed out of a plate of hard metal such as SK steel or the like. The flat blade 14, 14' has a straight-line blade portion 14a in its upper edge. The blade portion 14a has a triangular shape in section. The blade bearing plate 15, 15' is formed out of a plate of metal such as aluminum, stainless steel or the like. A V-shaped notch 15a for positioning the optical fiber 1 is formed at the center of the upper edge of the lower blade bearing plate 15. A tongue piece 15b is formed at the upper edge of the upper blade bearing plate 15' in a position opposite to the notch 15a of the lower blade bearing plate 15. This tongue piece 15b can enter the upper portion of the V-shaped notch 15a to some extent so as to position the optical fiber 1.

The specific dimensions of the coating removing blade 11 varies in accordance with the kind of optical fiber. For example, assume that coating removal is carried out on the optical fiber 1 in which the outer diameter of the glass portion 1a is 0.125 mm and the outer diameter of the coating 1b is 0.25 mm. In this case, it is preferable that the blade thickness of the semicircular blade 13 is set to be about 0.05–0.15 mm and the radius of the semicircular blade portion 13a is set to be about 0.07–0.1 mm. It is preferable that the flat blade 14 has a shape about 0.5–0.7 mm in thickness, about 70–120° in the angle of the triangular mountain of the blade portion 14a and 0.03–0.05 mm in the width of the flat portion in the top portion.

The blade pressing plate 12 is to press the semicircular blade 13 stably enough to prevent the semicircular blade 13 from bending due to the pulling force of the optical fiber 1. The thickness of the blade pressing plate 12 is selected suitably in accordance with the material of the metal plate forming the blade pressing plate 12, while the size of the semicircular notch 12a is formed to be small enough not to prevent the optical fiber from passing therethrough. The blade bearing plate 15, 15' is formed to be about 0.6–1.0 mm thick, while the V-shaped notch 15a of the lower blade bearing plate 15 is formed to have an angle of about 60° and to be deep enough to make the height of the center of the optical fiber 1 equal to the center of the circle of the blade portion 13a of the semicircular blade 13 when the V-shaped notch 15a is mated with the tongue piece 15b of the upper blade bearing plate 11'. Incidentally, the V-shaped notch 15a of the lower blade bearing plate 15 and the tongue piece 15b of the upper blade bearing plate 15' can be set to have suitable dimensions in accordance with the outer diameter of the optical fiber.

In the coating removing blade 11, the blade pressing plate 12, the semicircular blade 13, the flat blade 14 and the blade bearing plate 15 are laminated with their relative relationship trued up, and assembled integrally by the screw 16. The integrated coating removing blade 11 is attached to the front surface of the body portion 17 of the coating removing apparatus by the mounting screw 19.

On the other hand, the coating removing blade 11' having the blade pressing plate 12', the semicircular blade 13', the flat blade 14' and the blade bearing plate 15' laminated with their relative relationship trued up is attached to the pressing portion 18 side of the coating removing apparatus in the same manner.

As soon as the pressing portion 18 is closed on the body portion 17, the optical fiber 1 is positioned by the V-shaped notch 15a and the tongue piece 15b of the blade bearing plates 15 and 15'. When the upper and lower blade portions 13a are closed, the semicircular blades 13 are formed into a circle. Thus, the semicircular blades 13 compress the outer circumference of the coating 1b or eat into the coating so as to hold the optical fiber 1 therebetween. On the other hand, the flat blades 14 are set so that the distance between the upper and lower blade portions 14a is smaller than the outer diameter of the coating 1b and larger than the outer diameter of the glass portion 1a. Thus, the flat blades 14 hold the optical fiber 1 from above and below, and compress the coating 1b or eat into the coating so as to hold the optical fiber preform 1 therebetween.

When the optical fiber 1 held as shown in FIG. 1(B) is pulled out in the arrow direction (left direction in the drawing), the glass portion 1a can be pulled out without being crushed by the circular blade portion formed by the semicircular blades 13. Thus, the blade portions 13a are prevented from abutting or rubbing against the glass portion 1a to thereby damage the glass portion 1a. In addition, the coating 1b is held to be circular by the semicircular blades 13, so that the end portion from which the coating 1b has been removed has a non-crushed circular section. Thus, a failure in shape is prevented from occurring in the molding step of a fusion splicing portion. Then, the flat blade 14 adjacent to the semicircular blade 13 can suppress the concentration of removal dust of the coating 1b at the rear of the semicircular blade 13. Thus, the removal of the coating 1b can be carried out smoothly without applying an overload thereon when the coating is removed.

Figure 2:
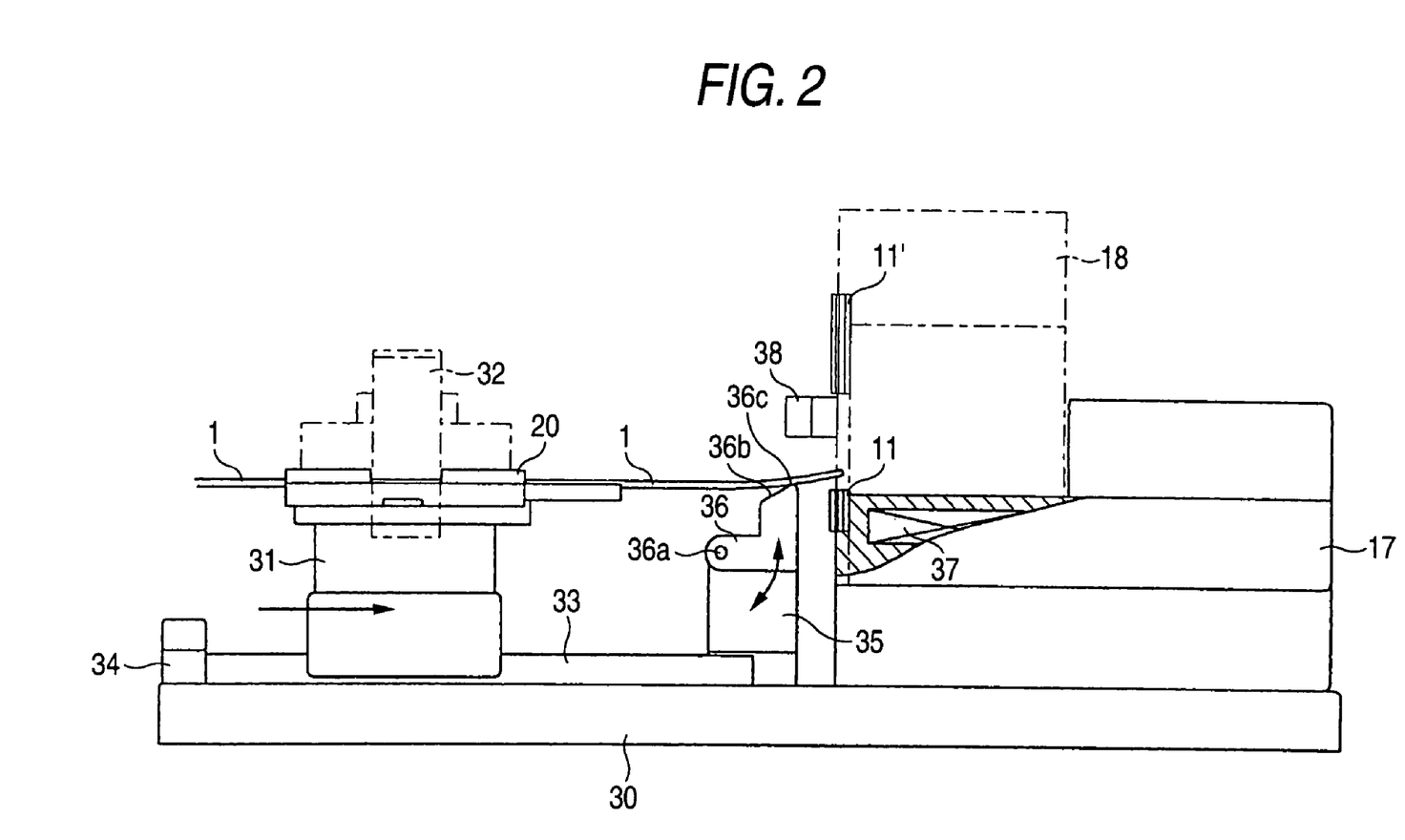
FIG. 2 is a side view of the optical fiber coating removing apparatus according to the present invention, showing the state where an optical fiber has been set in the coating removing apparatus and moved forward slightly.
Figure 3:
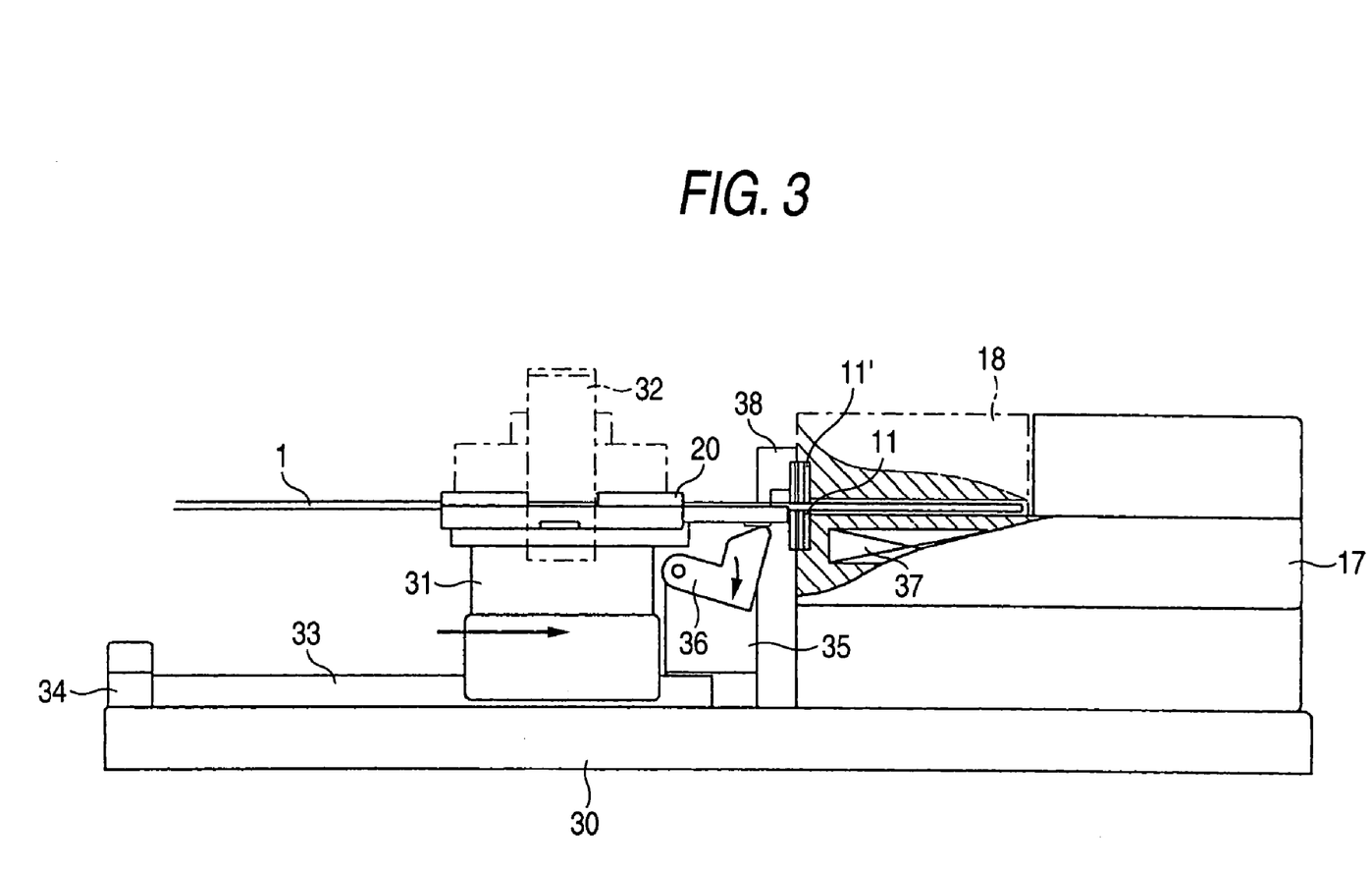
FIG. 3 is a side view of the optical fiber coating removing apparatus according to the present invention, showing the state where removal of coating from the optical fiber has been started.
Figure 4:
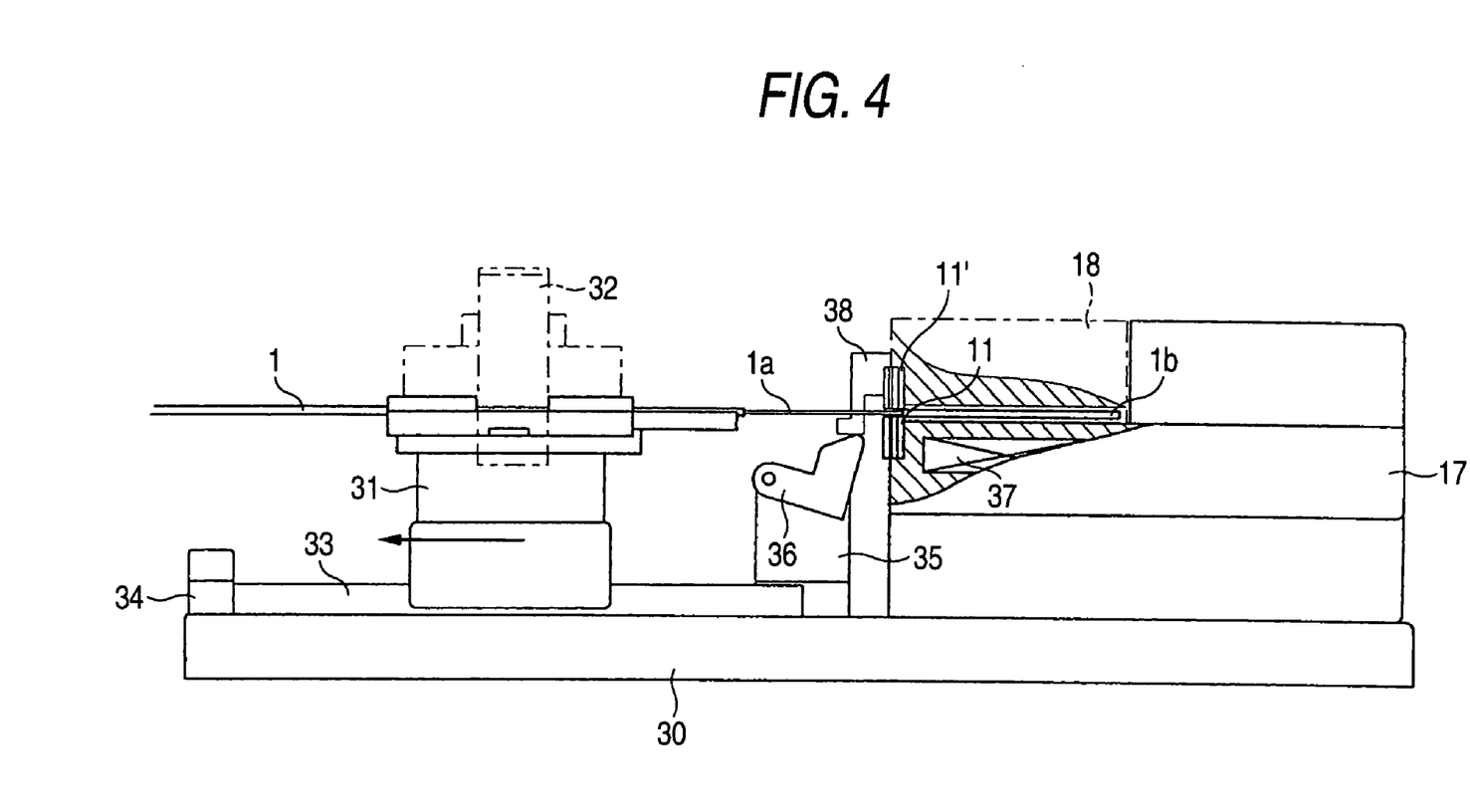
FIG. 4 is a side view of the optical fiber coating removing apparatus according to the present invention, showing the state where the removal of coating from the optical fiber is in operation.

FIGS. 2 to 4 show an example of the optical fiber coating removing apparatus according to the present invention.

Figure 5:
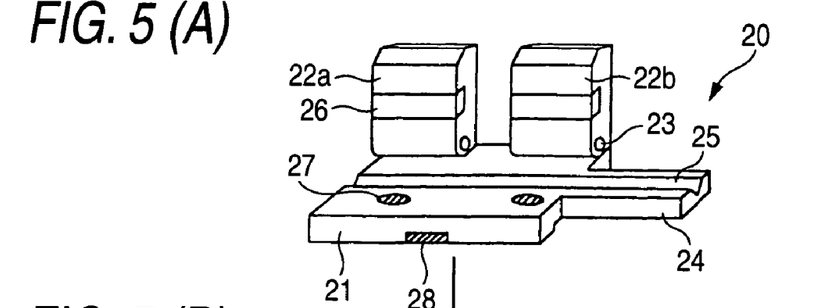
FIG. 5 is a perspective view showing examples of optical fiber holders for use in the optical fiber coating removing apparatus according to the present invention, FIG. 5(A) showing the state where a pair of clamp members are provided and an optical fiber has not yet been set, FIG. 5(B) showing the state where the optical fiber has been set, FIG. 5(C) showing the state where a single clamp member is provided and an optical fiber has not yet been set, FIG. 5(D) showing the state where the optical fiber has been set.

As shown in FIG. 2, the optical fiber coating removing apparatus has a holder support table 31 disposed on a base table 30 movably along a rail 33. The lower coating removing blade 11 and the upper coating removing blade 11' are disposed by fixing the body portion 17 and the pressing portion 18, respectively. An optical fiber holder 20 for holding the optical fiber 1 is removably attached onto the holder support table 31 so that the optical fiber 1 is conveyed (moved) by moving the holder support table 31. The backward position of the holder support table 31 is limited by a rear portion stopper 34 provided in the rear portion of the base table 30, while the forward position of the holder support table 31 is limited by abutment of the front end of the optical fiber holder 20 against the lower coating removing blade 11. It is convenient in handling to perform the position limitation by the front end of the optical fiber holder 20 because the position where coating removal is started is based on the front end of the optical fiber holder 20 in the same manner as in the fiber cutting step or the fusion splicing step which will be described later. A holder having a shape as will be described separately with reference to FIG. 5 is used as the optical fiber holder 20. The optical fiber holder 20 is positioned and mounted on the holder support table 31, and fixed by a holder clamp 32.

A lifting member 36 is provided in the coating removing apparatus in order to prevent the front end portion of the optical fiber 1 from colliding with the lower coating removing blade 11 when the optical fiber is moved. This lifting member 36 is disposed on the upper portion of a lifting member mounting table 35 and rotatably around a pivot 36a. This lifting member 36 has a slope 36b formed in its upper portion. Normally, the lifting member 36 is urged by spring means (not shown) so that an apex portion 36c of the lifting member 36 is located to be a little higher than the upper end of the coating removing blade 11 attached to the body portion 17.

This lifting member 36 is designed to be pushed downward by the abutment of the front end of the optical fiber holder 20 thereon. The pressing portion 18 is disposed on the body portion 17 so as to be able to be opened and closed by hinge means (not shown). In this pressing portion 18, a protrusion 38 is provided. Thus, the pressing portion 18 is designed so that the protrusion 38 can push the lifting member 36 downward when the pressing member 18 is closed (moved downward in the drawing).

As shown in FIG. 2, when the holder support table 31 is moved forward in the arrow direction in order to set the optical fiber 1 onto the body portion 17, the front end portion of the optical fiber 1 made free is lifted upward along the slope 36b of the lifting member 36. As a result, the front end portion of the optical fiber 1 can be conveyed (moved) onto the body portion 17 without abutting against the lower coating removing blade 11 attached to the body portion 17.

When the holder support table 31 is further moved forward, the front end of the optical fiber holder 20 abuts against the slope 36b so as to push the lifting member 36 downward and thereby release the optical fiber 1 from its lifted state. Thus, the optical fiber 1 is mounted on the coating removing blade 11 and the support surface of the body portion 17. Further, the optical fiber holder 20 is moved till the front end of the optical fiber holder 20 abuts against the lower coating removing blade 11. Then, the movement is terminated. After that, the pressing portion 18 is moved downward in the drawing so as to be closed. Thus, the protrusion 38 pushes the lifting member 36 further downward so as to release the lifting member 36 from abutment against the front end portion of the optical fiber holder 20 and make the lifting member 36 free.

The body portion 17 has the coating removing blade 11 fixedly attached thereto as described with reference to FIG. 1, while the coating removing blade 11' similar to the coating removing blade 11 is fixedly attached to the pressing portion 18 disposed openably and closably on the body portion 17. The pressing portion 18 may be kept in a closed state by the attraction of a magnet, or kept in a closed state by a mechanical lock. In addition, a heater 37 is disposed in the body portion 17 for heating the optical fiber 1 to thereby relieve the bonding force (adhesive force) between the coating portion to be removed and the optical fiber when the coating of the optical fiber 1 is removed. A power supply for heater heating, a control circuit, a switch and so on (not shown) are also received in the body portion 17.

Assume that the holder support table 31 is moved forward in the state of FIG. 2. In this case, the forward movement is stopped as soon as the holder support table 31 is moved to the position where the front end of the optical fiber holder 20 abuts against the coating removing blade 11 as shown in FIG. 3. The optical fiber preform 1 protruding from the front end of the optical fiber holder 20 is positioned by the V-shaped notch 15a (see FIG. 1) of the coating removing blade 11. After that, when the pressing portion 18 is closed, the upper and lower coating removing blades 11 and 11' are mated to hold the optical fiber 1 therebetween. Next, the coating 1b of the optical fiber 1 is softened by heating for a predetermined time with the heater 37 so that the bonding force of the coating 16 with the optical fiber is weakened. Incidentally, when the bonding force between the optical fiber and the coating is weak, the heating with the heater 37 is not required.

Next, as shown in FIG. 4, in the state in which the pressing portion 18 is closed, the holder support table 31 is retreated backward (left) as shown by the arrow. The optical fiber holder 20 and the optical fiber 1 are retreated together with the holder support table 31. Thus, the coating 1b in the front end portion of the optical fiber 1 is ripped out by the coating removing blades 11 and 11' so that the glass portion 1a in the front end portion can be exposed. The coating 1b of the optical fiber is pulled out, and coating dust formed into a substantially cylindrical sleeve is left on the body portion 17. Then, the pressing portion 18 is opened, and the coating dust is removed. Incidentally, although the optical fiber 1 may be extracted to the position where the front end of the glass portion 1a is out of the body portion 17, the front end of the glass portion 1a had better be left slightly on the body portion 17. In this case, disposal of the coating dust can be made easier when the sleeve-like coating dust is removed by hand after the optical fiber is extracted from the body portion with the sleeve-like coating dust adhering to the front end of the glass portion 1a.

FIG. 5 is a perspective view showing examples of optical fiber holders to be mounted on the holder support table 31. FIGS. 5(A) and (B) are views showing an example in which a pair of clamp members are provided, while FIGS. 5(C) and (D) are views showing an example in which a single clamp member is provided.

The optical fiber holder 20 is constituted by linking a clamp member 22 to a holder base 21 rotatably through a hinge shaft 23. An extension portion 24 is provided on the front portion side of the holder base 21 in the form of a solid structure. A V-groove 25 is formed in the extension portion 24. The V-groove 25 is so deep that the V-groove 25 can receive the optical fiber 1 and can be also formed continuously to the holder base 21. Incidentally, although the holder base 21 does not have to have a V-groove, the holder base 21 has to be designed so that the optical fiber 1 is fixedly held by the holder base 21 and the clamp member 22 when the clamp member 22 is closed.

In order to effectively hold and fix the optical fiber 1 received in the V-groove 25, an elastic member 26 may be disposed in the portion pressed by the clamp member 22. In addition, a magnet or magnets 27 may be buried in either the holder base 21 or the clamp member 22 or in the both so that the optical fiber 1 can be kept in the clamped state by the attraction of the magnet(s) 27. Further, a magnet 28 may be also buried in the bottom surface of the holder base 21 so that the holder base 21 can be attached to the holder support table 31 by the attraction of the magnet 28.

In the optical fiber holder 20 configured thus, the optical fiber 1 is received in the V-groove 25, and the clamp member 22 is closed to hold the optical fiber 1. Then, the optical fiber holder 20 is mounted on the holder support table 31 of the coating removing apparatus shown in FIGS. 2 to 4. The optical fiber holder 20 is held in a predetermined position by the attraction force of the magnet 28 and by positioning means such as a step portion or the like. In addition, as shown in FIGS. 2 to 4, the optical fiber holder 20 can be fixed firmly by a holder clamp 32 so as to make it sure to hold the optical fiber 1 when the optical fiber 1 is conveyed.

Figure 6:
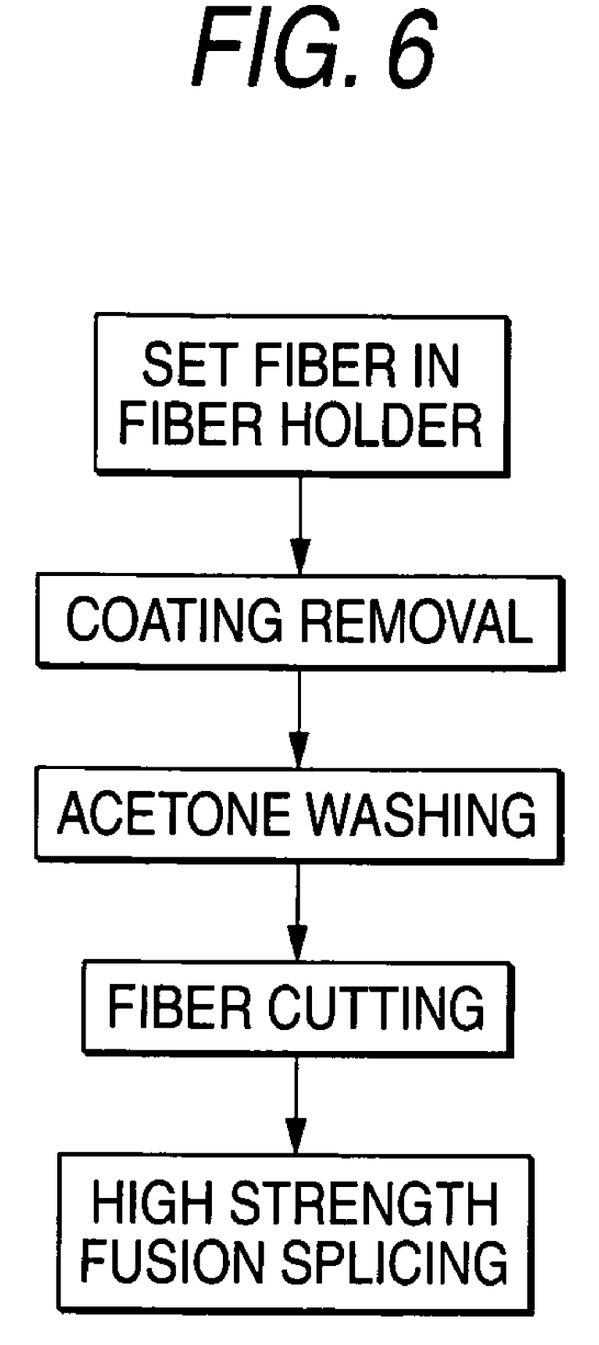
FIG. 6 is a diagram showing a working process for optical fiber fusion splicing.

Incidentally, when optical fibers are connected to each other by fusion splicing, the fusion splicing is carried out in the process as shown in FIG. 6. First, an optical fiber is set in the optical fiber holder 20, and a predetermined length of coating is then removed from the optical fiber by the coating removing apparatus according to the present invention. After the removal, the glass portion exposed in the optical fiber is cleansed by acetone washing, and fiber cutting is performed so that the exposed glass portion has a desired length. After the cutting, the glass portion of the optical fiber is connected to a glass portion of another optical fiber by fusion splicing. By use of the aforementioned optical fiber holder 20, each step can be carried out without removing the optical fiber preform 1 from the optical fiber holder 20.

For example, in the fiber cutting step in FIG. 6, the optical fiber holder 20 holding the optical fiber preform having its coating removed therefrom is set directly in a cutting apparatus. Then, by use of the V-groove 25 on the front end side of the extension portion 24, the coating end portion of the optical fiber preform is firmly pressed by clamp means and cut so that the glass portion 1b has a predetermined length. On the other hand, in the step of fusion splicing, the optical fiber preform 1 subjected to the fiber cutting is set directly in a fusion splicing apparatus together with the optical fiber holder 20. By use of the V-groove 25 on the front end side of the extension portion 24, the coating end portion of the optical fiber 1 is positioned while being pressed firmly by the clamp means, so that the end surface of the optical fiber 1 is aligned to the end surface of another optical fiber to be connected. High strength fusion splicing is performed while glass portions 1a of the optical fibers are made to abut against each other without being brought into contact with the V-groove substrate.

Figure 7:
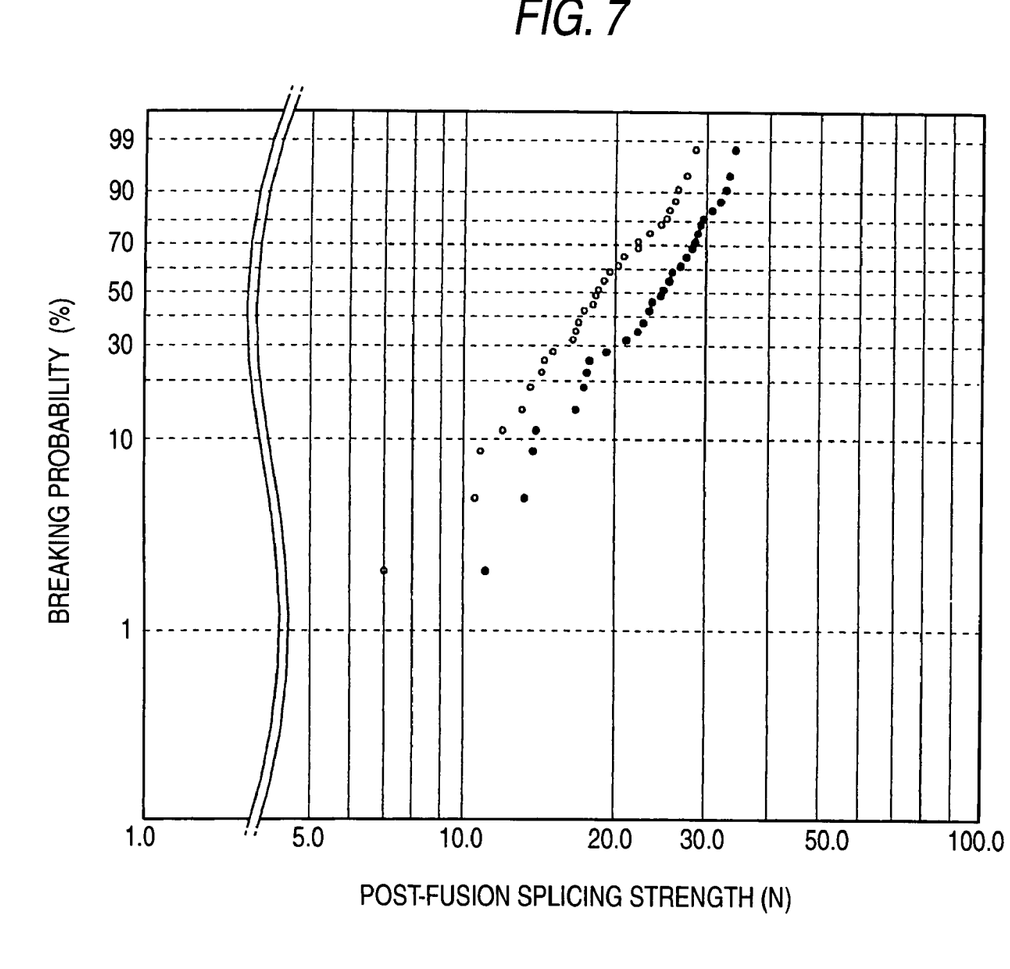
FIG. 7 is a graph for comparing the strength of fusion splicing after coating removal with the coating removing blades of the optical fiber coating removing apparatus according to the present invention with the strength of fusion splicing after coating removal with conventional coating removing blades.

FIG. 7 is a Weibull distribution graph plotting the relationship between the post-fusion splicing strength after the high strength fusion splicing and the breaking probability in the case of coating removal with the semicircular blades and the flat blades according to the present invention, and in the case of coating removal with only the conventional flat blades in order to make comparison. In this graph, the case where fusion splicing was performed after coating removal was performed with only the flat blades which were conventional coating removing blades is plotted with the symbol "○". On the other hand; the case where fusion splicing was-performed after coating removal was performed with the coating removing blades according to the present invention is plotted with the symbol "●". As is apparent from this graph, the coating removing blades according to the present invention improve the post-fusion splicing strength in comparison with the coating removing blades having the conventional configuration. When comparison is made using the line of the breaking probability 50%, the post-fusion splicing strength is 17.6 N in the case of using the coating removing blades having the conventional structure while the post-fusion splicing strength is 24.8 N in the case of using the coating removing blades according to the present invention. Thus, the post-fusion splicing strength in the latter is improved to be 1.4 times as high as that in the former.

Although the present invention has been described in detail and with reference to its specific embodiment, it will be obvious to those skilled in the art that various changes or modifications may be made without departing from the spirit and scope of the present invention.

This application is based on Japanese Patent Application (Japanese Patent Application No. 2001-177042) filed on Jun. 12, 2001, which is incorporated herein by reference as its entirety.

INDUSTRIAL APPLICABILITY

As is apparent from the above description, by use of coating removing blades each having a circular blade and a flat blade adjacent to each other according to the present invention, optical fiber coating removal can be performed without damaging the surface of the optical fiber, and the strength after fusion splicing can be enhanced. In addition, by use of an optical fiber holder and a lifting mechanism of an optical fiber preform, setting the optical fiber preform in the coating removing apparatus is made easier, and it is further possible to improve the workability in positioning of the optical fiber preform, disposal of coating dust, and so on.

The invention claimed is:

1. An optical fiber coating removing apparatus for nipping coating of an end portion of an optical fiber with a pair of coating removing blades and removing said coating with said pair of coating removing blades, wherein each of said coating removing blades includes a semicircular blade having a semicircular eating blade portion and fixedly laminated to a flat blade having a straight-line eating blade portion having a triangular shape in section.

2. An optical fiber coating removing apparatus according to claim 1, wherein a blade pressing plate and a blade bearing plate are provided in each of said coating removing blades, and said blade pressing plate, said semicircular blade and said flat blade are fixedly laminated onto said blade bearing plate in that order.

3. An optical fiber coating removing apparatus according to claim 2, wherein a V-shaped notch for positioning said optical fiber is formed in said blade bearing plate.

4. An optical fiber coating removing apparatus according to claim 1, wherein heating means for heating said end portion of said optical fiber is provided in a body portion having said coating removing blades attached thereto.

5. An optical fiber coating removing apparatus according to claim 2, wherein heating means for heating said end portion of said optical fiber is provided in a body portion having said coating removing blades attached thereto.

6. An optical fiber coating removing apparatus according to claim 1, wherein an optical fiber holder capable of holding said optical fiber and a holder support table for supporting said optical fiber holder are provided.

7. An optical fiber coating removing apparatus according to claim 2, wherein an optical fiber holder capable of holding said optical fiber and a holder support table for supporting said optical fiber holder are provided.

8. An optical fiber coating removing apparatus according to claim 6, wherein a lifting member is provided for lifting up a front end portion of said optical fiber protruding from said optical fiber holder so as to prevent said front end portion of said optical fiber from colliding with said coating removing blades when said optical fiber holder is moved to a predetermined position, and for releasing said front end portion of said optical fiber from lifting up when said optical fiber holder has been moved to said predetermined position.

9. An optical fiber coating removing apparatus according to claim 7, wherein a lifting member is provided for lifting up a front end portion of said optical fiber protruding from said optical fiber holder so as to prevent said front end portion of said optical fiber from colliding with said coating removing blades when said optical fiber holder is moved to a predetermined position, and for releasing said front end portion of said optical fiber from lifting up when said optical fiber holder has been moved to said predetermined position.

10. An optical fiber coating removing apparatus according to claim 1, wherein the coating removing blades are oppositely facing.

* * * * *